//united States Patent Office 3,700,650
Patented Oct. 24, 1972

3,700,650
VULCANIZATION OF EPIHALOHYDRIN POLYMERS
Hiroshi Hani, Bunji Amemiya, Ginnosuke Tanaka, Hiroshi Kawahara, and Minoru Yamada, Kanagawa-ken, Japan, assignors to Asahi Glass Co., Ltd., Tokyo, Japan
Filed June 5, 1970, Ser. No. 43,691
Claims priority, application Japan, June 12, 1969, 44/45,749; Sept. 5, 1969, 44/70,411; Oct. 14, 1969, 44/81,565; Oct. 28, 1969, 44/85,673; Dec. 9, 1969, 44/98,363
Int. Cl. C08g 23/00
U.S. Cl. 260—79       6 Claims

ABSTRACT OF THE DISCLOSURE

Epihalohydrin polymers, or epihalohydrin polymer-sulfur curable rubber systems, are vulcanized in the presence of a novel cross-linking formulation consisting essentially of (1) at least one compound selected from the group consisting of nickel carbonates, basic lead sulfates, basic lead sulfites and dithiocarbamates of sodium, copper, calcium, cadmium, lead, antimony, bismuth, selenium, manganese, iron, cobalt and amines, and (2) at least one member selected from the group consisting of 2-mercaptoimidazolines and 2-mercaptopyrimidines, thioureas, polyamines, or in the presence of a novel cross-linking formulation consisting of (1), (2) and (3) sulfur, as the case may be.

BACKGROUND OF THE INVENTION (1) Field of the invention

This invention relates to a new process for vulcanizing epihalohydrin polymers and to the resulting vulcanizates. More particularly, this invention relates to a new process for vulcanizing an epihalohydrin polymer, comprising heating said polymer in the presence of a new cross-linking formulation which will be particularly described hereinafter and to the vulcanizate that can be obtained by the method. As used herein, the term "vulcanizing" or "vulcanization" includes not only the process of vulcanizing epihalohydrin polymers but also the process of covulcanizing an epihalohydrin polymer with a sulfur-curable rubber. The term "covulcanizing" refers to the vulcanization of blends or plies of two or more polymers to produce vulcanized polymer blends or laminates. The epihalohydrin polymer mentioned herein is any of homopolymers of epihalohydrins, copolymers of dissimilar epihalohydrins, and copolymers of an epihalohydrin with one or more other epoxides. The foregoing definitions apply to the description of the invention that will hereinafter be going.

(2) Description of the prior art

Unlike the vulcanization of epoxide polymers containing double bonds, it is believed that epihalohydrin polymers are vulcanized by the halomethyl group being as the side chain of the polymer molecule. However, the precise mechanism involved remains yet to be fully elucidated. It is for this reason that any search for a suitable vulcanizing agent or cross-linking formulation is a quite difficult task.

Among the conventional processes for the homovulcanization of epihalohydrin polymers is the method taught by U.S. Pat. No. 3,026,305, which involves the use of a cross-linking formulation which is a combination of a polyamine, such as an aliphatic polyamine, an aromatic polyamine or a polymer amine, with at least one agent selected from the group consisting of sulfur, dithiocarbamates, thiuram sulfides and thiazoles. Also known is the method described in the specification of U.S. Pat. No. 3,341,491, which involves the use of a cross-linking formulation which is a combination of at least one metal compound selected from the group consisting of the carboxylates, carbonates, oxides, etc. of certain metals with at least one member selected from the group consisting of 2-mercaptoimidazolines, 2-mercaptopyrimidines and thioureas.

However, those conventional processes for the vulcanization of epihalohydrin polymers are disadvantageous, particularly, in such aspects as vulcanizing velocity, the thermal stability and non-colorability of the vulcanizate, etc. Thus, those cross-linking formulations are not necessarily satisfactory.

As for any covulcanizing process for an epihalohydrin polymer-sulfur curable rubber system, the mechanism involved is more complicated than that of the vulcanization of an epihalohydrin polymer alone. Thus, it is not as easy as adding sulfur to the cross-linking formulation usable in the homo-vulcanizing process.

For instance, if a binary system is covulcanized with use of a formulation consisting of the formulation according to U.S. Pat. No. 3,026,305 and sulfur, the polyamine and sulfur adversely affect each other so that the covulcanization reaction is substantially prevented from proceeding. The covulcanization method involving the use of a formulation consisting of the formulation according to U.S. Pat. No. 3,341,491 plus sulfur has been described in the specification of U.S. Pat. No. 3,351,517. Like the method taught by U.S. Pat. No. 3,341,491, this method is by no means a satisfactory covulcanizing process, either.

OBJECTS AND SUMMARY OF THE INVENTION

It is therefore an object of the invention to provide an improved vulcanizing process for epihalohydrin polymers.

It is a further object to provide a new vulcanizing process which enables epihalohydrin polymers to be vulcanized more rapidly than by conventional processes.

It is a still further object to provide a new vulcanizing process for epihalohydrin polymers, the vulcanizates being superior to the vulcanizates by conventional processes in thermal stability and/or mechanical properties.

A further object is to provide a covulcanizing method for epihalohydrin polymer-sulfur curable rubber systems, the improvements that can be realized being as set forth in the above description of the objects.

Further objects and advantages will become apparent as the following description proceeds. Our study of the vulcanization of epihalohydrin polymers led to the finding of a novel vulcanizing process whereby the foregoing objects of the invention may be easily accomplished.

Thus, this invention relates to a vulcanizing process which is characterized in that an epihalohydrin polymer is heated in the presence of a cross-linking formulation consisting of (1) at least one compound selected from the group consisting of nickel carbonates, basic lead sulfates, basic lead sulfites and dithiocarbamates of sodium, copper, calcium, cadmium, lead, antimony, bismuth, selenium, manganese, iron, cobalt and amines and (2) at least one agent selected from the group consisting of 2-mercaptoimidazolines, 2-mercaptopyrimidines, thioureas, polyamines, and, where said epihalohydrin polymer is covulcanized with sulfur-curable rubber, (3) sulfur.

Some of the compound (1) and the agent (2) which are to be employed in the vulcanizing process according to this invention are known to serve as a vulcanization accelerator for rubber in general, when used singly and independently of each other. However, if the compound (1) or the agent (2) is applied singly to an epihalohydrin polymer, said polymer is either not vulcanized at all or vulcanized in only an insufficient degree. In contrast, if the compound (1) and the agent (2) are used in combination as a cross-linking formulation in the vulcanization of an epihalohydrin polymer, those substances act as a vulcanizing agent, giving rise to an improved vulcanizate. This is a surprising finding. Furthermore, it has also been found that if sulfur (3) is further added to the above combination of compound (1) and agent (2), the resulting ternary formulation makes for a satisfactory covulcanization of an epihalohydrin polymer-sulfur curable rubber system.

In the vulcanizing process of this invention, which involves the use of a novel combination of compound (1) and agent (2) or, for said covulcanization, a novel combination of compound (1), agent (2) and sulfur (3), the epihalohydrin polymer is vulcanized at an unusually high vulcanizing velocity. In addition, the epihalohydrin polymer vulcanizate obtainable by the method of this invention features improvements in thermal stability and mechanical properties over those realized by the conventional methods.

DETAILED DESCRIPTION OF THE INVENTION

Figure 1:
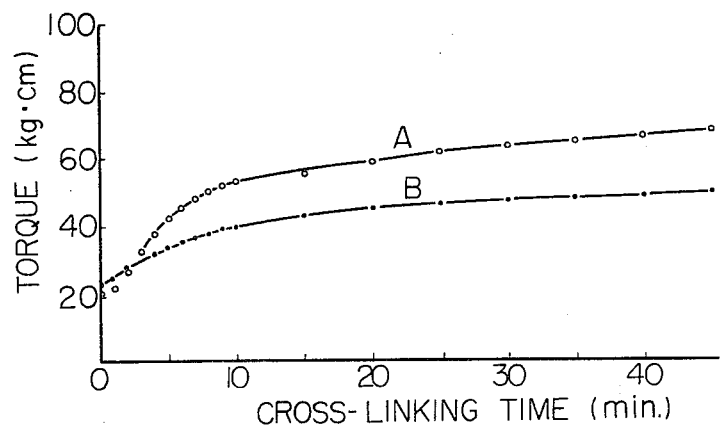
FIG. 1 shows the relation of cross-linking time in minutes to torque in kilogram·centimeters in the method described in Example 9 of this invention along with a similar relation for a control method.

The epihalohydrin polymers which can be vulcanized by the vulcanizing method of this invention include the homopolymers of epihalohydrins, the copolymers of dissimilar epihalohydrins, and the copolymers of any epihalohydrin wth one or more other epoxides. Among the epihalohydrins are epichlorohydrin, epifluorohydrin, epibromohydrin and the like. The aforementioned other epoxides include, among others, ethylene oxide, propylene oxide, butene oxide, cyclohexene oxide, styrene oxide, butadiene monoxide, perfluoropropylene oxide, perfluoroethylene oxide, ethylglycidyl ether, 2-chloroethylglycidyl ether, allylglycidyl ether, etc. Those polymers may be readily prepared by polymerizing epihalohydrins, or copolymerizing epihalohydrins with the other epoxides with a catalyst which may for example be an organoaluminum compound. Particularly, effective catalysts for the polymerization of epihalohydrins or the copolymerization of epihalohydrin with other epoxides can be prepared by reacting the reaction product of a hydrocarbon-aluminum compound and a cyclic ether with an imide in the molar ratio of 1:0.1 to 1:1 on the basis of the hydrocarbon-aluminum compound used. Epihalohydrin polymers may be obtained either in amorphous state or in crystalline state, or in the form of a varying mixture of the two forms, depending upon the methods of polymerization used and, particularly, upon the types of catalyst employed. And the vulcanizing process of this invention is applicable to any of the above polymer forms. However, in order to produce a superior rubber of epihalohydrin polymer, it is generally preferable to employ a polymer in which both amorphous and crystalline polymers are present and the proportion of the crystalline polymer is in the range of about 5 to 15 percent. In addition, depending upon the polymerization method that may be chosen, the molecular weight of the resulting epihalohydrin polymer may be varied. And any of such polymers having varying molecular weights may be vulcanized by the process of this invention. However, in order to produce a particularly superior rubber, the molecular weight of the epihalohydrin polymer is preferably in the range of about 200 thousand to about 5 million. This molecular weight range corresponds to 1–10 dl./g. in reduced specific viscosity (RSV). The term RSV, which is a function of molecular weight, is used herein to designate the specific viscosity measured at 30° C. in an nitrobenzene solution containing 0.1 g. per 100 ml. of the polymer divided by the concentration of the solution.

Any sulfur-curable rubber can be vulcanized with one or more of the above epihalohydrin polymers in accordance with the vulcanizing process of this invention. Exemplary sulfur-curable rubbers are styrene-butadiene rubber, natural rubber, isoprene rubber, polychloroprene, acrylonitrile-butadiene rubber, isoprene-isobutylene rubber, ethylene-propylene-diene terpolymer, cis-polybutadiene rubber, and cis-polyisoprene rubber, lower alkylene oxide-allylglycidyl ether copolymers such as propylene oxide-allylglycidyl ether copolymer.

In accordance with this invention, epihalohydrin polymers, or blends or plies of an epihalohydrin polymer with a sulfur-curable rubber, can be vulcanized or covulcanized by heating then in the presence of at least one of compounds (1) and at least one of agents (2) and, further, in the case of covulcanization, sulfur (3).

As has been previously stated, said compound (1) is any of nickel carbonates, basic lead sulfates, basic lead sulfites and the dithiocarbamates of sodium, copper, calcium, cadmium, lead, antimony, bismuth, selenium, manganese, iron, cobalt and amines. The nickel carbonates mentioned above include not only nickel carbonate as such but also basic nickel carbonates and acid nickel carbonates. From availability and effect considerations, however, basic nickel carbonates are most suited. The basic nickel carbonates include compounds wherein nickel carbonate are combined with varying proportions of nickel hydroxide and, further, of water. For example, compounds having such formulas as $$NiCO_3 \cdot 2Ni(OH)_2 \cdot 4H_2O$$

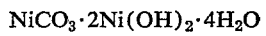

$2NiCO_3 \cdot 3Ni(OH)_2 \cdot 4H_2O$, etc. may be employed.

We are the first to use those compounds, i.e. basic lead sulfates and basic lead sulfite, in the vulcanization of rubbers. Thus, the compounds which may be written as lead oxide plus a varying proportion of lead sulfate or sulfite and sometimes further plus a varying proportion of water. While those basic lead sulfates and basic lead sulfites may thus be formally written as an articulate system consisting of, for example, lead sulfate or lead sulfite, lead oxide and water, they are markedly different from those compounds, possessing entirely different physical and chemical properties as evidenced by X-ray diffraction, differential heat analysis and other analytical methods. In addition, basic lead sulfates and basic lead sulfites, unlike the formal components, or mixture of these components, exhibit excellent vulcanizing effects when used in the vulcanization of epihalohydrin polymers. It is a particularly important advantage that with basic lead sulfates or sulfites, it is possible to obtain white vulcanizates which can hardly be manufactured with the use of conventional vulcanizing agents. As basic lead sulfates and basic lead sulfites, any of di, tri and poly-basic lead sulfates may be employed.

When one of the dithiocarbamates mentioned above is employed according to this invention, epihalohydrin polymers may be vulcanized at a particularly increased vulcanizing velocity. The type of di-thiocarbamate has an important bearing on the result, and of the salts enumerated herein, those of copper, lead and selenium are particularly beneficial. On the other hand, with any of the salts other than those named, such as nickel dithiocarbamate which is used in the control example, epihalohydrin polymers are substantially not vulcanized.

The dithiocarbamates which may be employed according to this invention include, among others, sodium diethyldithiocarbamate, sodium dibutyldithiocarbamate, copper dimethyldithiocarbamate, calcium diethyldithiocarbamate, zinc monomethyldithiocarbamate, lead dimethyldithiocarbamate, cadmium diethyldithiocarbamate, lead dicyclohexyldithiocarbamate, bismuth dimethyldithiocarbamate, selenium dimethyldithiocarbamate, antimony ethylphenyldithiocarbamate, manganese ethylenebis-dithiocarbamate, ferric dimethyldithiocarbamate, cobalt dimethyldithiocarbamate, pipecoline pipecolyldithiocarbamate, piperidium pentamethylene dithiocarbamate, etc. Those dithiocarbamates may be used either singly or in combination.

A suitable combination of the above member compounds may be employed as said compound (1). And particularly, excellent vulcanizing characteristics can be obtained when the dithiocarbamates are used in combination with one or more of said nickel carbonates, basic lead sulfates and basic lead sulfites.

As has been explained above, said compound (1) proves a particularly effective cross-linking agent for epichlorohydrin polymers when used in combination with at least one of said agents (2).

Thus, to cross-link an epihalohydrin polymer, any of 2-mercaptoimidazolines having the general formula:

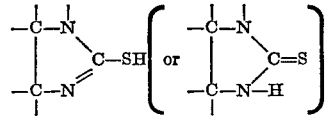

can be successfully used with one or more of said compound (1). Among the 2-mercaptoimidazolines that can thus be used are 2-mercaptoimidazoline, 4-methyl-2-mercaptoimidazoline and 5-ethyl - 4 - butyl - 2 - mercaptoimidazoline.

For the same cross-linking purpose, any of the 2-mercaptopyrimidines having the following general formula:

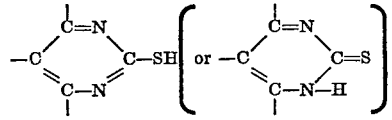

can be used in combination with one or more of said compounds (1). Among the 2-mercaptopyrimidines that can be used are 2-mercaptopyrimidine, 4,6-dimethyl-2-mercaptopyrimidine, 5'-butyl-2-mercaptopyrimidine and 4-ethyl-5-propyl-2-mercaptopyrimidine.

Any thiourea having the general formula:

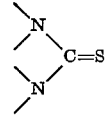

may be employed in combination with one or more of compounds (1). Thus, diethylthiourea, dibutylthiourea, trimethylthiourea, propylenethiourea may be mentioned by way of example.

Exemplary of the polyamine that can be employed in combination with one or more of compounds (1) are hexamethylene diamine, tetramethylene diamine, hexamethylene diamine and polyethyleneimine.

As regards said agent (2), 2-mercaptoimidazolines and 2-mercaptopyrimidines are especially preferred. When an epihalohydrin polymer is vulcanized with use of such a cross-linking formulation of this invention as described above, the amount of the cross-linking formulation may be selected over a wide range with the optimum amount depending upon the type of epihalohydrin, sulfur-curable rubber present, the type of the cross-linking formulation, the desired degree of cross-linking and other factors. Usually, the amount of the cross-linking formulation may be such that the compound (1) is in the range of from about 0.1 to about 30 part(s) by weight and the agent (2) in the range of from about 0.2 to about 7 part(s) by weight, per 100 parts by weight of the epihalohydrin polymer. In case an epihalohydrin polymer is covulcanized with a sulfur-curable rubber, the amount of sulfur (3) to be added as a supplement is preferably in the range of from about 0.2 to about 7 parts by weight on the same basis.

It may be desirable, in some cases, to add auxiliary or secondary accelerators. Among such secondary accelerators are guanidines, such as diorthotolyl guanidine, thiazoles such as mercaptobenzothiazoles, and certain amine based accelerators such as butylaldehyde-aniline condensate.

In the covulcanization of an epihalohydrin-sulfur-curable rubber system, the covulcanizable composition may be either a blend or a ply. In such a covulcanizable blend, the proportion of the epihalohydrin polymer may vary over a wide range, the determining factor being the properties desired in the vulcanizate.

In general, the amount of the epihalohydrin polymer may vary within the range of from about 20 to about 90 percent by weight of the blend. Such a blend may be prepared by any of the conventional rubber blending methods. For example, a two-roll mill may be used to blend an epihalohydrin polymer with a sulfur-curable rubber.

The components of the cross-linking composition, and the stabilizer if one is used, can be incorporated in or admixed with the polymer or blend in any desired manner. For example, they can be uniformly blended with the polymer or blend by milling in a Banbury mixer. By such a method, the cross-linking components may be evenly distributed throughout the polymer or blend.

In the case of covulcanizable plies to form laminates, the cross-linking components will be blended individually with the polymer and rubber before they are laid up. In any case, cross-linking takes place when the vulcanizable or covulcanizable composition is subjected to heat. The conditions under which cross-linking is accomplished can be varied within some broad latitude. Generally, the cross-linking temperature is in the range of about 100° C. to about 220° C. The cross-linking time varies inversely with the temperature and may range from about 2 minutes to about 5 hours. Cross-linking is generally conducted in metal molds under a compression of at least about 10 to about 200 atms.

In addition to the cross-linking components, other ingredients may also be incorporated. The additives normally employed in the vulcanization of rubber can be employed for the present purposes. Thus, for example, use may be made of various extenders such as stearic acid, lauric acid and zinc, sodium salt thereof, etc.; fillers such as carbon black, white carbon, etc.; antioxidants such as phenyl-β-naphthylamine, di-β-naphthyl-p - phenylenediamine, sym-di-β-naphthyl-p-phenylenediamine, N-isooctyl-p-aminophenol, the reaction product of diphenylamine and acetone, polymerized trimethyldihydroquinoline, 4,4-bis (6-tert-butyl-m-cresol), the reaction product of crotonaldehyde and 3-methyl-6-tert-butylphenyl, nickel dibutyldithiocarbamate, the zinc salt of 2-mercaptobenzimidazole; etc.; pigments, plasticizers, stabilizers, softeners, etc. The vulcanizates, particularly those containing reinforcing fillers and antioxidants, exhibit properties useful in applications requiring oil resistance, heat and flame resistance, solvent resistance, ozone resistance, and low temperature flexibility. Obviously there are cases in which no additive is required or desired, excellent results being achieved with the cross-linking components alone.

The following examples are given for illustrative purposes only. It is obvious that many modifications and changes may be made without departing from the scope and spirit of the invention described and claimed. In the examples, all parts are by weight.

the standard vulcanizate. Nickel carbonates, also in the table, are: basic nickel carbonate $$(NiCO_3 \cdot 2Ni(OH)_2 \cdot 4H_2O)$$

and nickel carbonate ($NiCO_3 \cdot 6H_2O$). The metal compounds in the control formulations are: basic calcium carbonate ($CaCO_3 \cdot Ca(OH)_2 \cdot H_2O$), nickel acetate $$(CH_3CO_2)_2Ni \cdot 4H_2O$$

and nickel sulfate ($NiSO_4 \cdot 7HO$).

TABLE 1(i)

| Ex. No. | Cross-linking formulation | | | Standard vulcanizate | | | | | | | Post-vulcanizate | | Aged vulcanizate | |
|---|---|---|---|---|---|---|---|---|---|---|---|---|---|---|
| | Compound (1) | Parts | Agent (2) | $T_B$ | $E_B$ | 12.5% | 50% | 100% | 200% | 300% | $T_B$ (percent change) | $E_B$ (percent change) | $T_B$ (percent change) | $E_B$ (percent change) |
| 1 | Basic nickel carbonate | 1 | 2-mercaptoimidazoline | 121 | 590 | 13 | 22 | 30 | 59 | 89 | 144 (+18) | 310 (−47) | 89 (−27) | 300 (−49) |
| 2 | do | 3 | do | 142 | 480 | 15 | 25 | 38 | 72 | 108 | 152 (+12) | 300 (−38) | 115 (−19) | 290 (−43) |
| 3 | do | 5 | do | 163 | 350 | 31 | 67 | 92 | 128 | 160 | 170 (+8) | 250 (−30) | 182 (+12) | 200 (−40) |
| 4 | do | 8 | do | 177 | 300 | 31 | 67 | 89 | 135 | 163 | | | 190 (+12) | 200 (−34) |
| 5 | do | 5 | do | 163 | 310 | 12 | 37 | 68 | 121 | 154 | 184 (+14) | 220 (−31) | 150 (−9) | 200 (−37) |
| 6 | do | 8 | do | 164 | 250 | 13 | 40 | 77 | 139 | | 173 (+6) | 170 (−27) | 168 (+2) | 170 (−30) |
| 7 | do | 5 | Diethylthiourea | 144 | 550 | 8 | 21 | 32 | 66 | 100 | 169 (+18) | 290 (−49) | 131 (−10) | 270 (−45) |
| 8 | do | 5 | Trimethylthiourea | 130 | 350 | 9 | 21 | 38 | 70 | 108 | 157 (+20) | 300 (−44) | 143 (+10) | 220 (−60) |
| 9 | Nickel carbonate | 5 | 2-mercaptoimidazoline | 158 | 370 | 13 | 29 | 55 | 110 | 150 | 190 (+20) | 200 (−46) | 183 (+16) | 200 (−46) |

TABLE 1 (ii)

| Control No. | Cross-linking formulation | | | Standard vulcanizate | | | | | | | Post-vulcanizate | | Aged vulcanizate | |
|---|---|---|---|---|---|---|---|---|---|---|---|---|---|---|
| | Compound | Parts | Agent | $T_B$ | $E_B$ | 12.5% | 50% | 100% | 200% | 300% | $T_B$ (percent change) | $E_B$ (percent change) | $T_B$ (percent change) | $E_B$ (percent change) |
| 1 | Not added | 0 | 2-mercaptoimidazoline | 126 | 590 | 28 | 45 | 61 | 88 | 111 | 150 (+19) | 270 (−59) | 118 (−8) | 250 (−56) |
| 2 | Copper carbonate | 5 | do | 121 | 560 | 17 | 30 | 44 | 78 | 98 | 155 (+30) | 440 (−20) | 66 (−46) | 350 (−32) |
| 3 | Nickel acetate | 5 | do | 108 | 420 | 20 | 29 | 46 | 88 | | 146 (+35) | 240 (−43) | 131 (+21) | 190 (−55) |
| 4 | Nickel sulfate | 5 | do | 91 | 480 | 22 | 29 | 38 | 63 | 82 | 117 (+27) | 300 (−38) | 109 (+20) | 250 (−49) |

EXAMPLES 1–9

In the following examples, an epichlorohydrin polymer having a RSV value of 12 (as determined in nitrobenzene at 30° C.) was made up into the following composition.

The polymer: 100 parts;
Zinc stearate: 1 part;
Nickel dibutyldithiocarbamate: 1 part;
Fast extrusion furnace black (FEF): 50 parts;

Cross-linking agent $\begin{cases} \text{compound (1) varied} \\ \text{agent (2) 1.5 parts} \end{cases}$ The above composition was milled on a two-roll mill for 20 minutes (2 rolls, 8″ dia. and 20″ long; 17 r.p.m. front roll, 20 r.p.m. rear roll; the front roll maintained at 70° C. and the rear roll at 80° C.). The composition was then vulcanized according to JIS–k–6300 (Japanese Industrial Standard). The physical properties of each vulcanizate were measured by the methods specified by JIS–k–6300. The standard vulcanization was conducted at 155° C. (170° C. in Examples 5 and 6) and at the pressure of 70 kg./cm.² for 45 minutes, and the post-vulcanization was effected at 168° C. and atmospheric pressure for 5 hours. An aging test was conducted at 150° C. for 72 hours, using a test-tube type aging tester as specified by JIS–k–6300. In Table 1-(i)–(ii) below, $T_B$ and $E_B$ denote tensile strength (kg./cm.²) and elongation (at break) (percent), respectively. Percent change means the change in percentage relative to the corresponding physical property of the standard vulcanizate. Nickel carbonates, also in the The vulcanizing velocities were measured with a Disk-Rheometer (built by Toyo Seiki K.K., L-rotor type, rotary reciprocating motion ±3°, 6 cycles per min.) at 155° C. for Example 9 and Control 1. Those velocities are shown by curves (A) and (B), respectively, in FIG. 1. In the measurement, the lowest torque reading after the input of the sample was assumed to be the cross-linking start time, and the change in torque (kg./cm.) was measured and plotted against cross-linking time (min.).

EXAMPLES 10–25

With the same composition as those used in Examples 1–9, vulcanization and aging tests were conducted under the conditions used in Examples 1–9, except that basic lead sulfate ($3PbO \cdot PbSO_4 \cdot \frac{1}{2}H_2O$) and basic lead sulfite ($PbO \cdot PbSO_3 \cdot \frac{1}{2}H_2O$) were used as compounds (1). The results are set forth in Table 2-(i)–Table 2-(iv).

Figure 2:
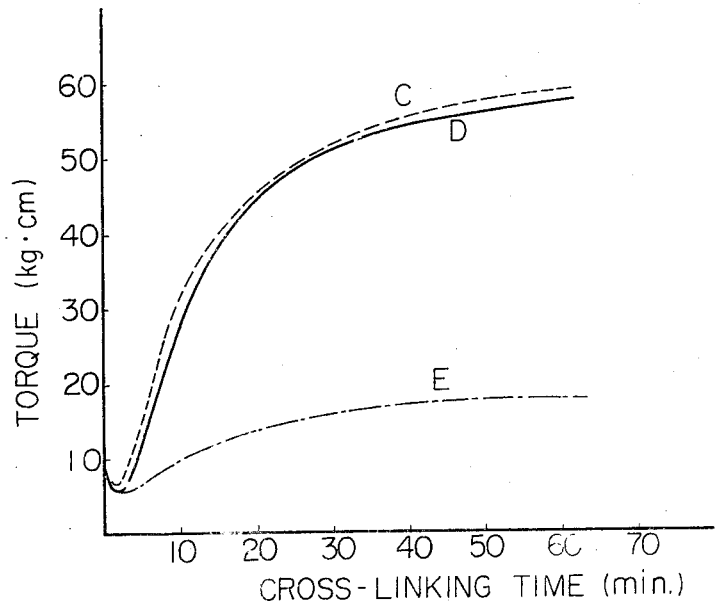
FIG. 2 shows the relation of cross-linking time in minutes with torque in kilogram·centimeters in the method described in Examples 14 and 22, with a control relation being also shown.

The cross-linking velocities for Examples 14, 22 and Control 4 as measured in a manner similar to that described in Examples 1–9, are shown by curves (C), (D) and (E) respectively in FIG. 2.

EXAMPLES 26–36

With composition similar to those used in Examples 1–9, vulcanization and aging tests were conducted under the conditions described in Examples 1–9, except that various dithiocarbamates were used as compounds (1). The results of those tests are set forth in Table 3-(i)–(ii).

Figure 3:
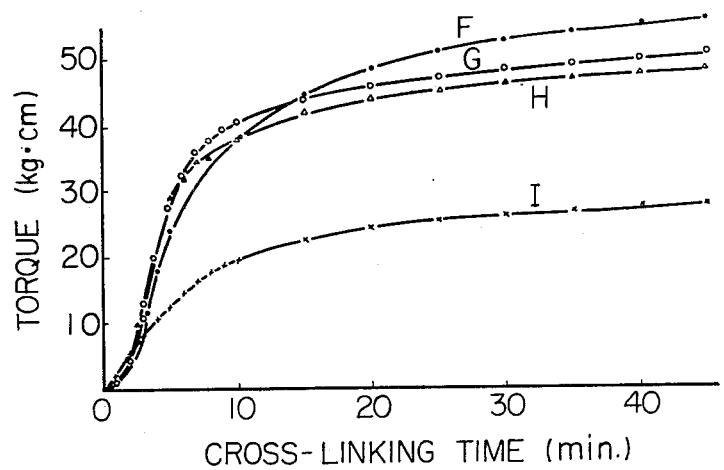
FIG. 3 shows the relation of cross-linking time in minutes with torque in kilogram·centimeters in the method described in Examples 26, 27 and 28, with a control relation being also shown.

The cross-linking velocities for Examples 26, 27, 28 and Control 1 as measured by the method described in Examples 1–9 are shown by curves (F), (G), (H) and (I) respectively in FIG. 3.

TABLE 2(i)

| | Cross-linking formulation | | | Standard vulcanizate | | | | | | |
|---|---|---|---|---|---|---|---|---|---|---|
| | Compound (1) | Parts | Agent (2) | $T_B$ | $E_B$ | Modulus (kg./cm.²) at— | | | | |
| | | | | | | 50% | 100% | 200% | 300% | 400% |
| Example No.: | | | | | | | | | | |
| 10 | Tribasic lead sulfate | 8 | Diethylthiourea | 114 | 600 | 21.4 | 41.7 | 70.0 | 93.3 | 106 |
| 11 | do | 5 | do | 108 | 578 | 27.3 | 42.5 | 69.0 | 92.4 | 106 |
| 12 | do | 8 | do | 102 | 568 | 26.0 | 38.4 | 64.0 | 88.0 | 99.1 |
| 13 | do | 2 | 2-mercaptoimidazoline | 130 | 370 | 30.4 | 54.3 | 100 | 118 | |
| 14 | do | 5 | do | 158 | 250 | 47.6 | 92.5 | 148 | | |
| 15 | do | 8 | do | 149 | 227 | 43.3 | 77.9 | 141 | | |
| 16 | do | 5 | Trimethylthiourea | 132 | 395 | 27.3 | 59.7 | 106 | 126 | |
| 17 | do | 5 | Hexamethylenediamine carbamate | 167 | 355 | 36.0 | 64.7 | 129 | | |
| 18 | Basic lead sulfite | 2 | Diethylthiourea | 106 | 555 | 30.5 | 42.0 | 75.0 | 73.4 | 101 |
| 19 | do | 5 | do | 89.8 | 513 | 28.5 | 39.6 | 66.4 | 85.4 | 89.4 |

TABLE 2(ii)

| | Cross-linking formulation | | | Standard vulcanizate | | | | | | |
|---|---|---|---|---|---|---|---|---|---|---|
| | Compound (1) | Parts | Agent (2) | $T_B$ | $E_B$ | Modulus (kg./cm.²) at— | | | | |
| | | | | | | 50% | 100% | 200% | 300% | 400% |
| Example No.: | | | | | | | | | | |
| 20 | Basic lead sulfite | 8 | Diethylthiourea | 85.9 | 514 | 29.5 | 38.8 | 63.9 | 80.0 | 92.3 |
| 21 | do | 2 | 2-mercaptoimidazoline | 146 | 373 | 29.8 | 37.4 | 107 | 136 | |
| 22 | do | 5 | do | 151 | 285 | 35.8 | 66.7 | 128 | | |
| 23 | do | 8 | do | 159 | 247 | 37.5 | 75.0 | 143 | | |
| 24 | do | 5 | Trimethylthiourea | 135 | 412 | 26.0 | 49.8 | 107 | 127 | 132 |
| 25 | do | 5 | Hexamethylene diamine carbamate | 166 | 341 | 30.8 | 63.1 | 123 | 160 | |
| Control No.: | | | | | | | | | | |
| 1 | Lead sulfide | 5 | 2-mercaptoimidazoline | 123 | 335 | 23.0 | 38.9 | 85.4 | 118 | |
| 2 | Lead chromate | 5 | do | 144 | 337 | 33.0 | 66.8 | 119 | 141 | |
| 3 | Lead metaborate | 5 | do | 128 | 228 | 26.2 | 46.1 | 94.8 | 141 | |
| 4 | None | 0 | do | 126 | 290 | | | | | |
| 5 | do | 0 | Hexamethylene diamine carbamate | 148 | 481 | 33.4 | 53.8 | 101 | 127 | |

TABLE 2(iii)

| | Post-vulcanizate | | | | | | Aged vulcanizate | | | | |
|---|---|---|---|---|---|---|---|---|---|---|---|
| | $T_B$ (percent change) | $E_B$ (percent change) | Modulus (kg./cm.²) at— | | | | $T_B$ (percent change) | $E_B$ (percent change) | Modulus (kg./cm.²) at— | | |
| | | | 50% | 100% | 200% | 300% | | | 50% | 100% | 200% |
| Example No.: | | | | | | | | | | | |
| 10 | 136 (−11.3) | 316.5 (−49.2) | 29.8 | 51.8 | 112 | 148 | 91.2 (−22.6) | 332 (−47.7) | 31.0 | 44.9 | 59.3 |
| 11 | 145 (+33.8) | 386 (−33.2) | 34.1 | 58.4 | 112 | 139 | 106 (−3.2) | 274 (−53.2) | 36.9 | 58.9 | 99.6 |
| 12 | 160 (+55.5) | 347 (−39.3) | 36.9 | 60.7 | 122 | 156 | 153 (+46.3) | 213 (−62.8) | 46.5 | 81.9 | |
| 13 | 157 (+17.7) | 218 (−42.5) | 37.4 | 78.0 | | 120 | (−12.0) | 222 (−42.1) | 30.3 | 57.5 | 117 |
| 14 | 163 (+1.2) | 152.5 (−40.3) | 48.3 | 99.2 | | 174 | (+8.6) | 168 (−33.6) | 46.1 | 90.0 | |
| 15 | 157 (+4.4) | 142 (−32.6) | 57.3 | 119 | | 171 | (+13.1) | 135 (−40.0) | 66.6 | 138 | |
| 16 | 171 (+27.6) | 199 (−48.6) | 41.0 | 95.0 | | 107 | (−20.0) | 210 (−46.6) | 34.8 | 64.7 | 107 |
| 17 | 196 (+18.6) | 289 (−16.8) | 38.3 | 74.1 | | 60.0 | (−63.9) | 322 (−7.6) | | | |
| 18 | 144 (+37.8) | 353 (−37.3) | 36.8 | 66.0 | 118 | 141 | 97.3 (−7.1) | 306 (−45.3) | 39.3 | 62.0 | 95.0 |
| 19 | 133 (+46.5) | 347 (−33.5) | 38.1 | 57.6 | 106 | 126 | 116 (+29.8) | 289 (−45.1) | 43.7 | 67.7 | 113 |

TABLE 2(iv)

| | Post-vulcanizate | | | | | | Aged vulcanizate | | | | |
|---|---|---|---|---|---|---|---|---|---|---|---|
| | $T_B$ (percent change) | $E_B$ (percent change) | Modulus (kg./cm.²) at— | | | | $T_B$ (percent change) | $E_B$ (percent change) | Modulus (kg./cm.²) at— | | |
| | | | 50% | 100% | 200% | 300% | | | 50% | 100% | 200% |
| Example No.: | | | | | | | | | | | |
| 20 | 147 (+59.2) | 366 (−28.3) | 41.8 | 64.0 | 113 | 138 | 164 (+89.0) | 213 (−58.3) | 62.4 | 108 | |
| 21 | 185 (+27.2) | 224 (−40.0) | 42.5 | 93.7 | 155 | | 144 (−3.0) | 231 (−39.1) | 38.3 | 76.6 | 236 |
| 22 | 179 (+16.2) | 172 (−38.3) | 49.0 | 103 | | | 177 (+13.9) | 170 (−40.3) | 56.7 | 113 | |
| 23 | 181 (+14.1) | 159 (−31.5) | 55.6 | 230 | | | 177 (+10.0) | 147 (−38.3) | 68.0 | 150 | |
| 24[1] | 167 (+23.7) | 224 (−48.4) | 46.6 | 85.0 | | | 19.4 (−85.6) | 379 (−12.0) | 12.7 | 148 | 19.4 |
| 25 | 194 (+16.3) | 272 (−20.3) | 44.6 | 85.5 | 160 | | 89.1 (−46.5) | 305 (−10.7) | | | |
| Control No.: | | | | | | | | | | | |
| 1 | 135 (+9) | 166 (−45.4) | 35.7 | 78.5 | | | 121 (−1.6) | 147 (−53.0) | 36.5 | 80.4 | |
| 2 | 151 (+4.8) | 174 (−48.4) | 43.0 | 91.0 | | | 142 (−1.0) | 155 (−53.2) | 46.6 | 89.1 | |
| 3 | 160 (+24.9) | 198 (−12.6) | 45.1 | 86.4 | | | 144 (+1.3) | 205 (−11.2) | 34.1 | 69.6 | |
| 4 | 150 (+19.0) | 270 (−9.3) | | | | | 11.8 (−8.0) | 250 (−13.8) | | | |
| 5 | 118 (−21.3) | 401 (−18.0) | 34.5 | 46.5 | 77.5 | | 33.6 (−77.4) | 342 (−28.9) | | | |

[1] The aging test was carried out at 150° C. for 192 hours.

TABLE 3(i)

| | Cross-linking formulation | | |
|---|---|---|---|
| Test No. | Compound (1) | Parts | Agent (2) |
| Control: | | | |
| 1 | None | 0 | 2-mercaptoimidazoline. |
| 2 | Nickel dibutyldithiocarbamate | 5 | Do. |
| Example: | | | |
| 26 | Copper dimethyldithiocarbamate | 5 | Do. |
| 27 | Selenium dimethyldithiocarbamate | 1 | Do. |
| 28 | Iron dimethyldithiocarbamate | 5 | Do. |
| 29 | Sodium dibutyldithiocarbamate | 1 | Do. |
| 30 | Cadmium diethyl dithiocarbamate | 1 | Do. |
| 31 | Lead dimethyl dithiocarbamate | 1 | Do. |
| 32 | do | 5 | Do. |
| 33 | Bismuth dimethyl dithiocarbamate | 1 | Do. |
| 34 | Copper dimethyl dithiocarbamate | 1 | Diethylthiourea. |
| 35 | do | 1 | Trimethylthiourea. |
| 36 | Piperidinium pentamethylene-dithiocarbamate | 1 | 2-mercaptoimidazoline. |

EXAMPLES 37–52

Composition similar to those used in Examples 1–9 were vulcanized except that 1 part of a dithiocarbamate and 4 parts of another type of compound (1) were used as compound (1) and that the use of nickel dibutyldithiocarbamate was dispensed with.

Figure 4:
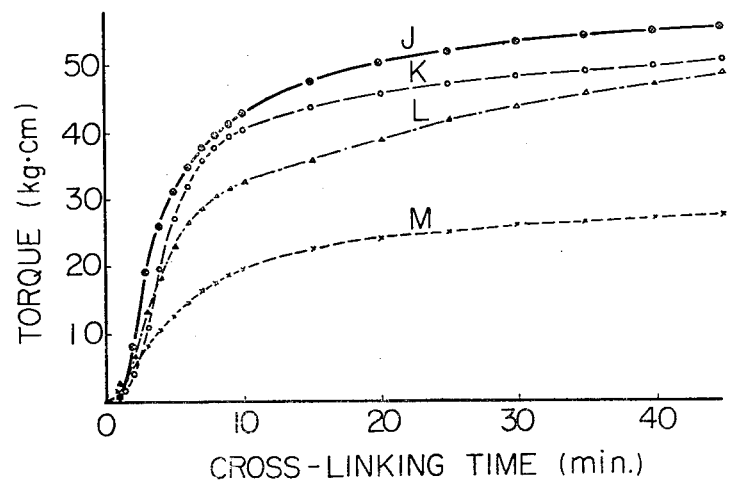
FIG. 4 shows the relation of cross-linking time in minutes with torque in kilogram·centimeters in the method described in Example 37, with a control relation being also shown.

Vulcanization and aging tests were conducted under the conditions described in Examples 1–9 (JIS–k–6300), provided that the curing time used in Example 12 was 15 minutes. The results of those tests are set forth in Table 4-(i)–(iii). The cross-linking velocities measured for Example 37 and Controls 1, 3, 4 as measured by the method described in Examples 1–9 are shown by curves (J), (K), (L) and (M) respectively in FIG. 4.

TABLE 3(ii)

| | Standard vulcanizate | | | | | | Post-vulcanizate | |
|---|---|---|---|---|---|---|---|---|
| | | | Modulus (kg./cm.$^2$) at— | | | | $T_B$ (percent change) | $E_B$ (percent change) |
| Test No. | $T_B$ | $E_B$ | 12.5% | 50% | 100% | 200% | 300% | | |
| Control: | | | | | | | | | |
| 1 | 126 | 590 | 28 | 45 | 61 | 88 | 111 | 150 (+19) | 270 (−59) |
| 2 | 120 | 550 | 13 | 19 | 35 | 77 | 106 | 143 (+19) | 261 (−52) |
| Example: | | | | | | | | | |
| 26 | 146 | 300 | 23 | 41 | 78 | 136 | | 189 (+19) | 240 (−20) |
| 27 | 166 | 350 | 16 | 28 | 78 | 114 | 156 | 171 (+3) | 270 (−23) |
| 28 | 150 | 240 | 21 | 40 | 79 | | | 144 (−4) | 150 (−38) |
| 29 | 131 | 490 | 14 | 21 | 35 | 66 | 97 | 152 (+16) | 290 (−41) |
| 30 | 145 | 390 | 15 | 27 | 49 | 99 | 136 | 170 (+17) | 220 (−44) |
| 31 | 140 | 490 | 11 | 21 | 36 | 69 | 101 | 166 (+19) | 250 (−49) |
| 32 | 141 | 460 | 17 | 26 | 49 | 107 | 130 | 193 (+38) | 150 (−67) |
| 33 | 149 | 440 | 15 | 27 | 48 | 91 | 129 | 167 (+12) | 240 (−45) |
| 34 | 145 | 830 | 10 | 14 | 25 | 44 | 69 | 153 (−5) | 420 (−49) |
| 35 | 141 | 850 | 9 | 13 | 23 | 45 | 69 | 158 (+12) | 500 (−42) |
| 36 | 150 | 300 | 16 | 28 | 49 | 93 | 130 | 170 (−17) | 200 (−33) |

TABLE 4(i)

| | Cross-linking formulation | | |
|---|---|---|---|
| | Dithiocarbamate | Metal compound | Agent (2) |
| Control: | | | |
| 1 | | | 2-mercaptoimidazoline. |
| 2 | | Basic nickel carbonate | Do. |
| 3 | | Red lead | Do. |
| 4 | Selenium dimethyldithiocarbamate | | Do. |
| Example: | | | |
| 37 | do | Basic nickel carbonate | Do. |
| 38 | Copper dimethyldithiocarbamate | Basic lead sulfite | Do. |
| 39 | Nickel dimethyldithiocarbamate | Basic nickel carbonate | Do. |
| 40 | Bismuth dimethyldithiocarbamate | do | Do. |
| 41 | Copper dimethyldithiocarbamate | do | Do. |
| 42 | do | do | Trimethylthiourea. |
| 43 | Selenium dimethyldithiocarbamate | do | Hexamethylene diamine carbamate. |
| 44 | Sodium diethyldithiocarbamate | do | 2-mercaptoimidazoline. |
| 45 | Copper dimethyldithiocarbamate | do | Do. |
| 46 | Calicum diethyldithiocarbamate | do | Do. |
| 47 | Cadmium diethyldithiocarbamate | do | Do. |

TABLE 4(ii)

| | Cross-linking formulation | | |
|---|---|---|---|
| | Dithiocarbamate | Metal compound | Agent (2) |
| Example: | | | |
| 48 | Diethyldithiocarbamate | Basic nickel carbonate | 2-mercaptoimidazoline. |
| 49 | Manganese ethylene-bis-dithiocarbamate | do | Do. |
| 50 | Iron dimethyldithiocarbamate | do | Do. |
| 51 | Cobalt dimethyldithiocarbamate | do | Do. |
| 52 | Piperidinium pentamethylene dithiocarbamate | do | Do. |

TABLE 4(iii)

| | Standard vulcanizate | | | | | | | Post-vulcanizate | | Aged vulcanizate | |
|---|---|---|---|---|---|---|---|---|---|---|---|
| | $T_B$ | $E_B$ | 12.5% | 50% | 100% | 200% | 300% | $T_B$ (percent change) | $E_B$ (percent change) | $T_B$ (percent change) | $E_B$ (percent change) |
| Control: | | | | | | | | | | | |
| 1 | 126 | 590 | 28 | 45 | 61 | 83 | 111 | 150 (+19) | 270 (−59) | 118 (−8) | 250 (−56) |
| 2 | 156 | 400 | 26 | 50 | 75 | 106 | 130 | 163 (+4) | 250 (−37) | 150 (−4) | 220 (−45) |
| 3 | 160 | 300 | 17 | 41 | 79 | 149 | _____ | 170 (+6) | 150 (+ 6) | 165 (+5) | 170 (−43) |
| 4 | 166 | 350 | 16 | 28 | 98 | 114 | 156 | 171 (+3) | 270 (−23) | 83 (−50) | 330 (−6) |
| Example: | | | | | | | | | | | |
| 37 | 163 | 540 | 18 | 27 | 46 | 86 | 126 | 182 (+12) | 220 (+59) | 170 (+4) | 180 (−67) |
| 38 | 160 | 310 | 18 | 32 | 58 | 111 | _____ | 192 (+20) | 180 (−42) | 178 (+11) | 200 (−35) |
| 39 | 163 | 410 | 21 | 44 | 70 | 120 | 151 | 195 (+19) | 200 (−40) | 170 (+3) | 230 (−44) |
| 40 | 186 | 300 | 22 | 39 | 76 | 151 | _____ | 188 (+1) | 200 (−33) | 183 (−2) | 170 (−33) |
| 41 | 155 | 450 | 14 | 23 | 44 | 93 | 136 | 194 (+19) | 320 (−29) | 163 (0) | 320 (−29) |
| 42 | 159 | 490 | 14 | 24 | 43 | 89 | 133 | 194 (+15) | 250 (−49) | 164 (+3) | 270 (−45) |
| 43 | 188 | 450 | 28 | 47 | 76 | 136 | 179 | 223 (+19) | 300 (−33) | 169 (−10) | 220 (−51) |
| 44 | 184 | 250 | 21 | 41 | 79 | 155 | _____ | 193 (+5) | 200 (−20) | 158 (−14) | 270 (−32) |
| 45 | 166 | 380 | 20 | 40 | 67 | 124 | 159 | 197 (+18) | 250 (−35) | 175 (+4) | 190 (−29) |
| 46 | 178 | 300 | 22 | 38 | 71 | 136 | _____ | 192 (+8) | 200 (−33) | 169 (−5) | 170 (−43) |
| 47 | 190 | 290 | 20 | 36 | 68 | 136 | _____ | 199 (+5) | 200 (−31) | 190 (0) | 200 (−31) |
| 48 | 191 | 290 | 22 | 39 | 74 | 151 | _____ | 197 (+3) | 200 (−31) | 175 (−9) | 200 (−31) |
| 49 | 176 | 350 | 23 | 39 | 68 | 133 | _____ | 195 (+11) | 200 (−43) | 186 (+6) | 180 (−49) |
| 50 | 187 | 280 | 23 | 43 | 78 | 156 | _____ | 192 (+3) | 200 (−29) | 157 (−16) | 180 (−36) |
| 51 | 187 | 290 | 20 | 37 | 69 | 144 | _____ | 180 (+1) | 180 (−38) | 195 (+5) | 180 (−39) |
| 52 | 178 | 300 | 18 | 34 | 72 | 145 | _____ | 190 (+7) | 200 (−33) | 152 (−15) | 180 (−40) |

EXAMPLE 53

Ethyleneoxide-epichlorohydrin copolymer (containing 50 mole percent of ethylene oxide; RSV 13 as determined in nitrobenzene at 30° C.) was milled with 50 parts carbon black (FEF), 1.0 part zinc stearate (extender), 1.0 part selenium dimethyl dithiocarbamate, 4.0 parts basic nickel carbonate and 1.5 parts 2-mercaptoimidazoline on the two-roll mill for 20 minutes.

The resulting vulcanizable composition was heated at 155° C. and 75 kg./cm.² for 45 minutes. The vulcanizate was found to possess a tensile strength of 180 kg./cm.², an elongation of 300% and a modulus at 100% elongation of 78 kg./cm.².

An aging test was conducted on this vulcanizate at 150° C. for 72 hours, using a test-tube type aging tester as specified by JIS-k-6300. The aged product had a tensile strength of 188 kg./cm.² and an elongation of 280%.

EXAMPLE 54

Epichlorohydrin polymer (RSV 12 as determined in nitrobenzene at 30° C.) and styrene-butadiene rubber (Japan Synthetic Rubber, Ltd., "TSR-1500") were covulcanized. A master batch of epichlorohydrin polymer was prepared by milling 100 parts said epichlorohydrin polymer, 50 parts FEF carbon black and, 1 part of zinc stearate at 60–70° C. for 10 minutes. In a similar manner, 100 parts styrene-butadiene rubber, 50 parts FEF carbon black and 1 part zinc stearate were milled to prepare a master batch of SBR. The above master batches were mixed on the two-roll mill for 5 minutes, at the end of which time various additives were added. The final composition is given below. The mixture was further milled for about 5 minutes.

| | Parts |
|---|---|
| Epichlorohydrin polymer | 50 |
| Styrene-butadiene rubber | 50 |
| Nickel carbonate | 5 |
| 2-mercaptoimidazoline | 1.5 |
| Zinc stearate | 0.5 |
| Zinc oxide | 2 |
| Stearic acid | 0.5 |
| Polymerized trimethyldihydroquinoline | 1 |
| Sulfur | 1.5 |

The resulting covulcanizable composition was heated at 155° C. and 70 kg./cm.² for 45 minutes. The resulting covulcanizate was found to have a tensile strength of 170 kg./cm.², an elongation of 200%, and a modulus at 100% elongation of 91 kg./cm.².

EXAMPLE 55

The covulcanization of epichlorohydrin polymer and styrene-butadiene rubber was conducted by the method described in Example 54, except that the following composition was employed.

| | Parts |
|---|---|
| Epichlorohydrin polymer | 50 |
| Styrene-butadiene rubber | 50 |
| Copper dimethyldithiocarbamate | 1 |
| 2-mercaptoimidazoline | 1.5 |
| Zinc stearate | 0.5 |
| Zinc oxide | 2 |
| Stearic acid | 0.5 |
| Polymerized trimethyldithioquinoline | 1 |
| Sulfur | 1.5 |

The resulting vulcanizate was found to have a tensile strength of 188 kg./cm.², an elongation of 150% and a modulus at 100% elongation of 63 kg./cm.².

EXAMPLE 56

The covulcanization of epichlorohydrin polymer and styrene-butadiene rubber was carried out by the method described in Example 54, except that the following formulation was employed.

| | Parts |
|---|---|
| Epichlorohydrin polymer | 50 |
| Styrene-butadiene polymer | 50 |
| Copper dimethyldithiocarbamate | 1 |
| Nickel carbonate | 4 |
| 2-mercaptoimidazoline | 1.5 |
| Zinc stearate | 0.5 |
| Zinc oxide | 2 |
| Stearic acid | 0.5 |
| Polymerized trimethylhydroquinoline | 1 |

The resulting covulcanizate was found to have a tensile strength of 190 kg./cm.², an elongation of 150% and a modulus at 100% elongation of 98 kg./cm.².

EXAMPLES 57–61

The covulcanization of epichlorohydrin polymer and styrene-butadiene rubber was conducted by the method described in Example 54, except that the composition given in Table 5 was employed. The physical properties of the vulcanizates are shown in Table 6. The physical properties of the same vulcanizates after aging at 150° C. for 72 hours are shown in Table 7.

TABLE 5

| Recipe | Control No. | | Example No. | | | | |
|---|---|---|---|---|---|---|---|
| | 1 | 2 | 57 | 58 | 59 | 60 | 61 |
| Epichlorhydrin polymer | 50 | 50 | 100 | 50 | 50 | 25 | _____ |
| Styrene-butadiene rubber | 50 | 50 | _____ | 50 | 50 | 75 | 100 |
| Tribasic sulfate | _____ | _____ | 5.0 | 5.0 | 2.5 | 5.0 | 5.0 |
| 2-mercaptoimidazoline | _____ | _____ | 1.5 | 1.5 | 1.5 | 1.5 | 1.5 |
| Diethyl thiourea | 2.0 | _____ | _____ | _____ | _____ | _____ | _____ |
| FEF-carbonblack | 50 | 50 | 50 | 50 | 50 | 50 | 50 |
| Zinc stearate | 1.0 | 1.0 | 1.0 | 1.0 | 1.0 | 1.0 | 1.0 |
| Stearic acid | 0.5 | 0.5 | _____ | 0.5 | 0.5 | _____ | 1.0 |
| Zinc oxide | _____ | _____ | _____ | _____ | 2.5 | _____ | _____ |
| Polymerized trimethyl dithioquinoline | 1.0 | 1.0 | 1.0 | 1.0 | 1.0 | 1.0 | 1.0 |
| Sulfur | 1.5 | 1.5 | 1.0 | 1.0 | 1.5 | 1.8 | 2.0 |

TABLE 6

| Physical properties | Control No. | | Example No. | | | | |
|---|---|---|---|---|---|---|---|
| | 1 | 2 | 57 | 58 | 59 | 60 | 61 |
| Tensile strength (kg./cm.²) | 177 | 77.8 | 177 | 208 | 200 | 184 | 202 |
| Elongation at break (percent) | 550 | 500 | 370 | 290 | 345 | 270 | 410 |
| Modulus at 50% (kg./cm.²) | 13.7 | 10.1 | 37.6 | 41.5 | 18.5 | 30.3 | 14.8 |
| Modulus at 100% (kg./cm.²) | 24.2 | 17.1 | 72.8 | 76.0 | 41.0 | 65.8 | 27.8 |
| Modulus at 200% (kg./cm.²) | 51.6 | 36.1 | 134 | 154 | 107 | 142 | 82.4 |
| Modulus at 300% (kg./cm.²) | 86.6 | 52.4 | 162 | | 171 | | 134 |

TABLE 7

| Phsical properties | Control No. | | Example No. | | | | |
|---|---|---|---|---|---|---|---|
| | 1 | 2 | 57 | 58 | 59 | 60 | 61 |
| Tensile strength (kg./cm.²) | 28.1 | 33.5 | 171 | 55.4 | 43.6 | 73.9 | 47.5 |
| Percent change | −76 | −57 | −3.4 | −73 | −78 | −60 | −76 |
| Elongation at break (percent) | 17 | 17 | 100 | 10 | 10 | 20 | 10 |

We claim:

1. In a process of vulcanizing a polymer of epichlorohydrin by heating said polymer at about 100° to about 220° C. under a pressure of at least about 10 to about 200 atmospheres in the presence of a cross-linking formulation until vulcanized, the improvement in said cross-linking formulation, said formulation essentially consisting of about 0.1 to about 30 parts of a nickel compound selected from the group consisting of nickel carbonate and basic nickel carbonate, and of about 0.2 to about 7 parts of a sulfur-bearing agent per 100 parts of said polymer, said sulfur-bearing agent being selected from the group consisting of a 2-mercaptoimidazoline, a 2-mercaptopyrimidine, and a thiourea, said parts being by weight.

2. In a process as set forth in claim 1, said formulation consisting essentially of a basic nickel carbonate and a 2-mercaptoimidazoline.

3. A process according to claim 1, wherein said polymer is a homopolymer of epichlorohydrin.

4. A process according to claim 1, wherein said polymer is a copolymer of ethylene oxide and epichlorohydrin.

5. The process of claim 1, wherein said agent is 2-mercaptoimidazoline.

6. The process of claim 1, wherein said agent is thiourea.

References Cited

UNITED STATES PATENTS

| 3,341,491 | 9/1967 | Robinson et al. | 260—45.75 |
| 3,414,529 | 12/1968 | Green et al. | 260—2 |
| 3,503,910 | 3/1970 | Amberg et al. | 260—18 |

DONALD E. CZAJA, Primary Examiner

M. I. MARQUIS, Assistant Examiner

U.S. Cl. X.R.

156—306; 161—184, 247; 260—2 A, 2 Ep, 3, 41 B, 79.5 C, 874, 887, 888, 890, 897